US012606192B2

(12) United States Patent
Oshima et al.

(10) Patent No.: US 12,606,192 B2
(45) Date of Patent: Apr. 21, 2026

(54) CONTROL DEVICE FOR PROMPTING BATTERY DIAGNOSIS AND VEHICLE HAVING SUCH CONTROL DEVICE

(71) Applicant: TOYOTA JIDOSHA KABUSHIKI KAISHA, Toyota (JP)

(72) Inventors: Yoshimaru Oshima, Toyota (JP); Yuki Sugo, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 18/882,766

(22) Filed: Sep. 12, 2024

(65) Prior Publication Data

US 2025/0214601 A1     Jul. 3, 2025

(30) Foreign Application Priority Data

Dec. 27, 2023     (JP) ................................. 2023-220901

(51) Int. Cl.
*B60W 50/14*          (2020.01)
*B60W 50/02*          (2012.01)

(52) U.S. Cl.
CPC ........ *B60W 50/14* (2013.01); *B60W 50/0205* (2013.01); *B60W 2510/244* (2013.01)

(58) Field of Classification Search
None
See application file for complete search history.

(56) References Cited

U.S. PATENT DOCUMENTS

| | | | | |
|---|---|---|---|---|
| 2012/0310568 A1* | 12/2012 | Wang | ................. | G01R 31/3842 |
| | | | | 702/63 |
| 2019/0016231 A1* | 1/2019 | Scaringe | ............. | H01M 10/613 |
| 2020/0254899 A1 | 8/2020 | Uchida et al. | | |
| 2021/0091582 A1* | 3/2021 | Jin | ......................... | H02J 7/0048 |

FOREIGN PATENT DOCUMENTS

| | | | | |
|---|---|---|---|---|
| JP | 2020-137156 A | 8/2020 | | |
| KR | 102087696 B1 * | 3/2020 | ........... | G01R 31/382 |

* cited by examiner

*Primary Examiner* — Abdhesh K Jha
(74) *Attorney, Agent, or Firm* — SoraIP, Inc.

(57)          ABSTRACT

ECU (control device) includes a processor that estimates a full charge capacity of the power storage device, a RAM (first memory) that stores the full charge capacity estimated by the processor, and a communication unit that communicates with a HMI device (information terminal) of electrified vehicle. The auxiliary battery is mounted on electrified vehicle so as to be electrically disconnected from electrified vehicle. When the elapsed time from the point in time when electrified vehicle was last activated (first point in time) to the point in time when electrified vehicle was activated this time (second point in time) is larger than a predetermined value, the communication unit transmits a notification prompting HMI device to diagnose the power storage device.

5 Claims, 3 Drawing Sheets

FIG. 1    <u>100</u>
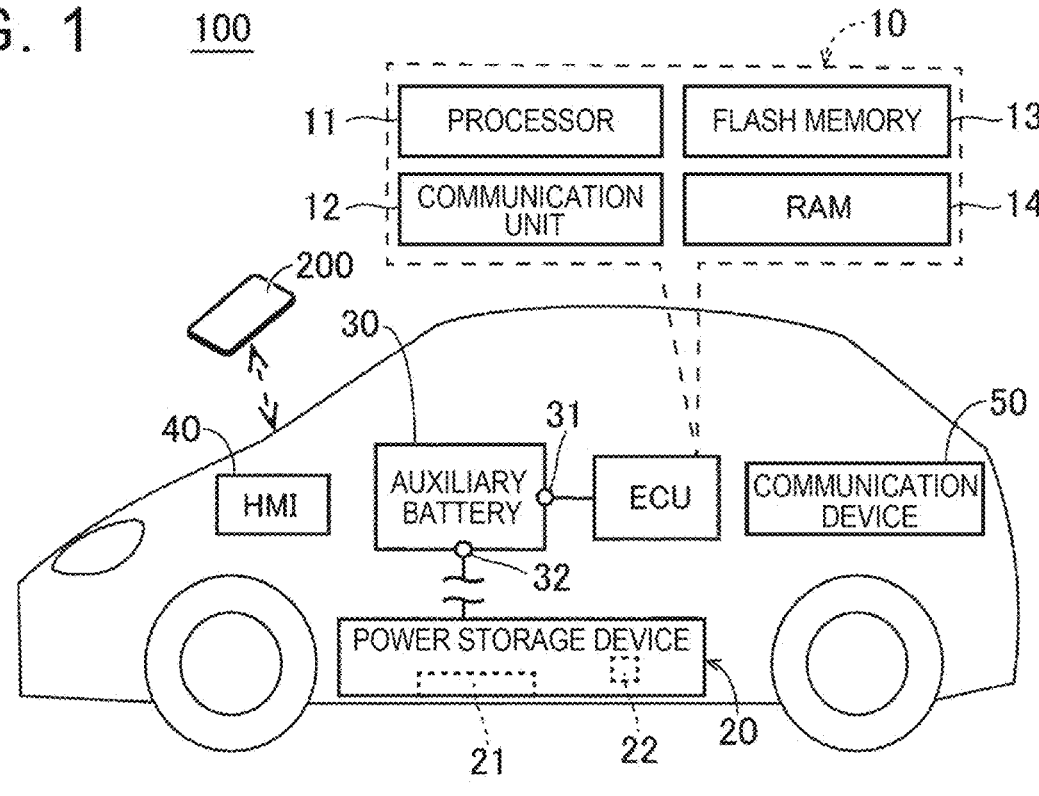
FIG. 2
T3
T1 DISCONNECTING THE ELECTRICAL
CONNECTION BETWEEN
THE AUXILIARY BATTERY AND T2
THE ELECTRIFIED VEHICLE
LAST
START
START
THIS TIME
FIG. 3
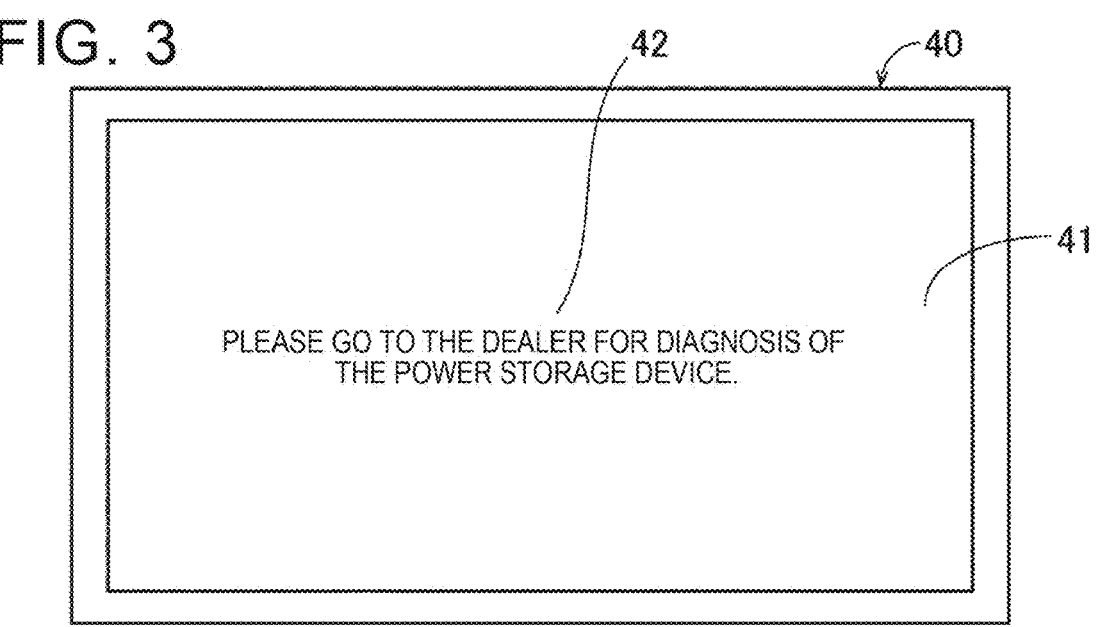
PLEASE GO TO THE DEALER FOR DIAGNOSIS OF
THE POWER STORAGE DEVICE.

CONTROL DEVICE FOR PROMPTING BATTERY DIAGNOSIS AND VEHICLE HAVING SUCH CONTROL DEVICE

CROSS-REFERENCE TO RELATED APPLICATION

This application claims priority to Japanese Patent Application No. 2023-220901 filed on Dec. 27, 2023, incorporated herein by reference in its entirety.

BACKGROUND

1. Technical Field

The present disclosure relates to a control device and a vehicle.

2. Description of Related Art

Japanese Unexamined Patent Application Publication No. 2020-137156 (JP 2020-137156 A) discloses a vehicle that notifies a user of a vehicle of a capacity retention rate, which is an index of a deterioration state of a battery, and an estimation error of the capacity retention rate. When the estimation error is greater than a reference value, the user is prompted to re-diagnose the battery.

SUMMARY

JP 2020-137156 A does not take into consideration an auxiliary battery that supplies electric power to an electronic control unit (ECU) for calculating the estimation error. Accordingly, when the auxiliary battery is removed from the vehicle, for example, neither can the estimation error be calculated, nor can the user be prompted regarding diagnosis of the battery. As described above, in the vehicle described in JP 2020-137156 A, prompting regarding diagnosis of a battery (power storage device) may not be able to be performed at an appropriate timing.

The present disclosure can solve the above problems. The present disclosure can provide a control device and a vehicle capable of prompting diagnosis of a power storage device at an appropriate timing.

A control device according to a first aspect of the present disclosure is a control device for controlling a vehicle in which a power storage device and an auxiliary battery are installed, and also from which auxiliary battery, electric power is supplied.

The control device includes a processor that estimates a full charge capacity of the power storage device, first memory that stores the full charge capacity estimated by the processor, and a communication unit that communicates with an information terminal owned by a user of the vehicle.

The auxiliary battery is installed in the vehicle so as to be capable of interrupting electrical connection with the vehicle.

The communication unit transmits, to the information terminal, a notification prompting diagnosis of the power storage device, when an elapsed time from a first point in time at which the vehicle was started up a prior time to a second point in time at which the vehicle was started up this time is greater than a predetermined value.

Note that the term "communicates with an information terminal" also includes transmitting and receiving information to and from the information terminal by relaying via a communication device or the like that is different from the information terminal.

In the control device according to the first aspect of the present disclosure, as described above, when the elapsed time from the first point in time at which the vehicle was started up a prior time to the second point in time at which the vehicle was started up this time is greater than the predetermined value, a notification prompting diagnosis of the power storage device is transmitted to the information terminal. Here, when the elapsed time is relatively great, it is conceivable that there is a higher likelihood that the auxiliary battery go dead during the elapsed time, as compared with when the elapsed time is relatively small. For this reason, there are cases in which the user of the vehicle will interrupt the electrical connection between the auxiliary battery and the vehicle during the elapsed time, in order to suppress the auxiliary battery from going dead. In this case, no electric power is supplied from the auxiliary battery to the control device. Accordingly, the control device cannot acquire data (temperature of the power storage device, etc.) for estimating the full charge capacity of the power storage device during this elapsed time. Due to this, the control device cannot accurately estimate the full charge capacity of the power storage device. Therefore, by configuring the control device as described above, a notification prompting diagnosis of the power storage device can be transmitted to the information terminal in a case in which there is a relatively high likelihood that the full charge capacity of the power storage device cannot be accurately calculated. Thus, prompting of diagnosis of the power storage device can be performed at an appropriate timing.

The control device according to the first aspect preferably includes second memory for storing the first point in time, the second memory being non-volatile. According to this configuration, even when the electrical connection between the auxiliary battery and a vehicle main body is interrupted, the information of the first point in time that is stored in the second memory can be used.

In the control device according to the first aspect, preferably, when the elapsed time is greater than the predetermined value, the communication unit transmits, to the information terminal, a notification that prompts checking the vehicle into a facility capable of performing the diagnosis of the power storage device. According to this configuration, when there is a relatively high likelihood that the full charge capacity of the power storage device cannot be accurately estimated, estimating the full charge capacity of the power storage device at the facility can be prompted.

In the control device according to the first aspect, preferably, the first memory is volatile memory. According to this configuration, when the electrical connection between the auxiliary battery and the vehicle is interrupted, the information regarding the full charge capacity stored in the first memory is lost. Thus, the full charge capacity cannot be estimated using the information of the full charge capacity stored in the first memory. Accordingly, transmitting the notification prompting diagnosis of the power storage device to the information terminal as described above is particularly effective for accurately estimating the full charge capacity of the power storage device installed in the vehicle equipped with the first memory (for the user to recognize the accurate full charge capacity).

A vehicle according to a second aspect of the present disclosure includes a power storage device, an auxiliary battery, and the control device according to the first aspect.

Accordingly, a vehicle can be provided that is capable of prompting diagnosis of the power storage device at an appropriate timing.

According to the present disclosure, diagnosis of a power storage device installed in a vehicle can be prompted at an appropriate timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a configuration of a electrified vehicle according to an embodiment;

FIG. 2 is a diagram illustrating an activation point in time (T1, T2) and an elapsed time T3 of a electrified vehicle according to an embodiment;

FIG. 3 is a first diagram illustrating notifications displayed on a HMI device of a electrified vehicle according to one embodiment;

DETAILED DESCRIPTION OF EMBODIMENTS

Figure 4:
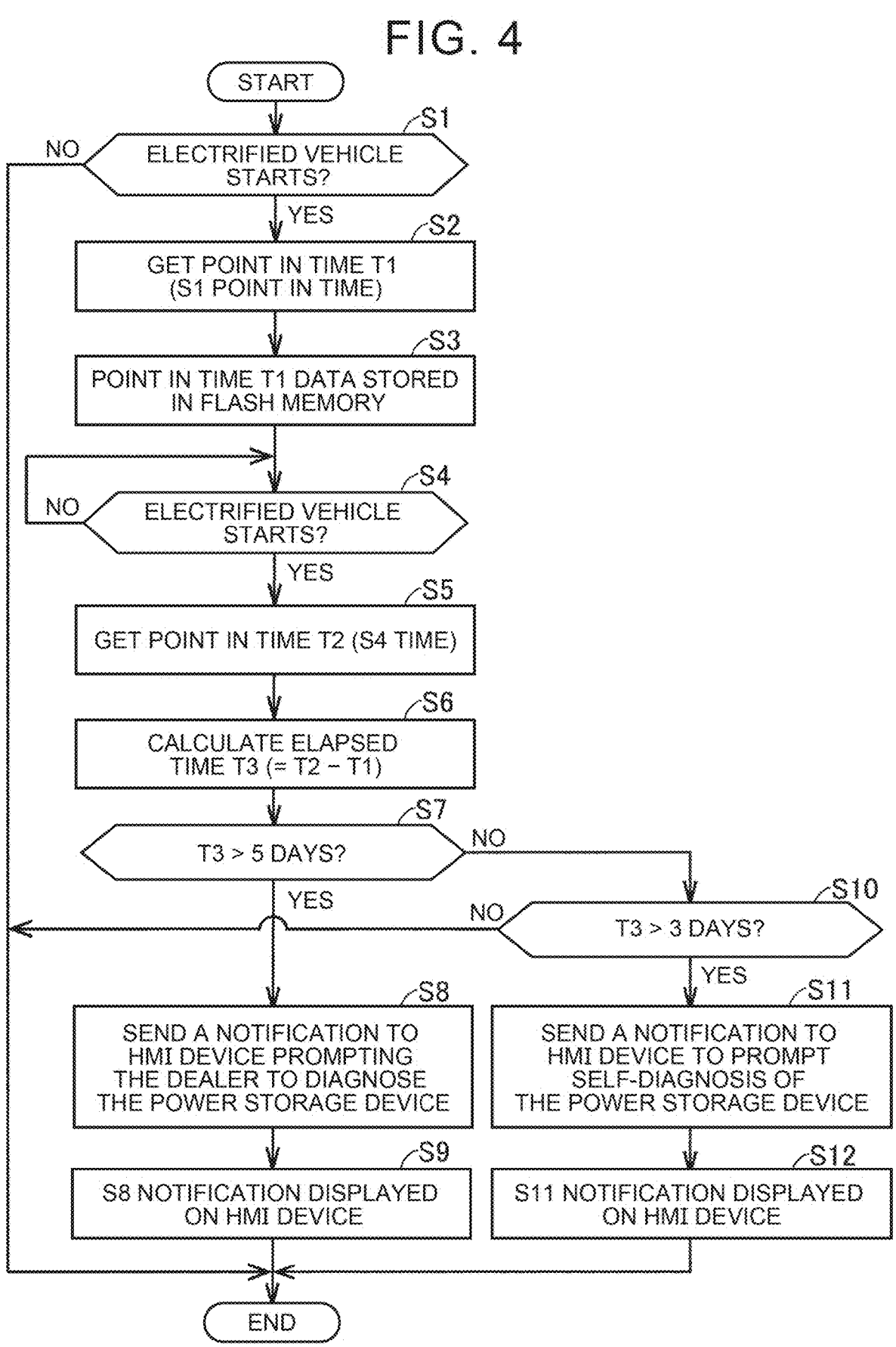
FIG. 4 is a flowchart illustrating control of electrified vehicle (ECU) according to one embodiment.

Hereinafter, an embodiment of the present disclosure will be described in detail with reference to the drawings. The same or corresponding parts in the drawings are designated by the same reference signs and repetitive description will be omitted.

Configuring Electrified Vehicle

FIG. 1 is a diagram illustrating a configuration of a electrified vehicle 100 according to the present embodiment. Note that electrified vehicle 100 is an exemplary "vehicle" of the present disclosure.

Electrified vehicle 100 includes an ECU (Electronic Control Unit) 10, a power storage device 20, and an auxiliary battery 30. Electrified vehicle 100 further comprises an HMI (Human Machine Interface) device 40 and a communication device 50. Note that ECU 10 and HMI device 40 are exemplary "control devices" and "information terminals" of the present disclosure, respectively.

Electrified vehicle 100 is vehicles in which the power storage device 20 and the auxiliary battery 30 are mounted as described above. Electrified vehicle 100 include, for example, PHEV (Plug-in Hybrid Electric Vehicle), BEV (Battery Electric Vehicle), or FCEV (Fuel Cell Electric Vehicle).

ECU 10 is a device that controls electrified vehicle 100. ECU 10 is supplied with electric power from the auxiliary battery 30. The detailed configuration of ECU 10 will be described later.

The power storage device 20 stores electric power used for driving (for example, traveling) electrified vehicle 100. The power storage device 20 includes a power storage cell 21 and a temperature sensor 22. The power storage cell 21 is constituted by a secondary battery such as a lithium-ion battery, a nickel metal hydride battery, or a sodium-ion battery. The type of the secondary battery may be a liquid secondary battery or an all-solid secondary battery. A plurality of secondary batteries may form a battery pack. The temperature sensor 22 detects the temperature of the power storage cell 21. The temperature sensor 22 may be provided outside the power storage device 20.

The auxiliary battery 30 is an in-vehicle battery that supplies electric power for driving the auxiliary devices mounted on electrified vehicle 100. The auxiliary battery 30 supplies electric power to, for example, an ECU (e.g., an ECU 10) connected to the low-voltage power supply line.

The auxiliary battery 30 includes, for example, a terminal 31 and a terminal 32. Wires in electrified vehicle 100 are connected to the terminals 31 and 32, respectively. The auxiliary battery 30 can be electrically disconnected from electrified vehicle 100 by disconnecting the wires from the terminals 31 and 32. The number of terminals provided in the auxiliary battery 30 is not limited to the above example.

HMI device 40 includes a car navigation device, a speaker, and the like. HMI device 40 (car navigation device) is capable of displaying the present position of electrified vehicle 100 and searching for a route to a destination (a waypoint). In addition, HMI device 40 (car navigation device) provides various types of information to the user by displaying a message or the like.

The communication device 50 is capable of communicating with a communication device external to electrified vehicle 100. For example, the communication device 50 can communicate with the mobile terminal 200 (for example, a smart phone, a smart watch, and the like) owned by the user of electrified vehicle 100 by Bluetooth (registered trademark). In addition, the communication device 50 may be capable of communicating with servers or the like outside electrified vehicle 100. Note that the mobile terminal 200 may be capable of communicating with HMI device 40 or may be capable of communicating with ECU 10.

ECU 10 includes a processor 11, a communication unit 12, a flash memory 13, and a RAM (Random Access Memory) 14. The flash memory 13 and RAM14 are exemplary "second memory" and "first memory" of the present disclosure, respectively.

The processor 11 executes, for example, a process of estimating the full charge capacity of the power storage device 20. The full charge capacity is the amount of electric power (kWh) stored in the power storage device 20 in which SOC (State Of Charge) is 100%. The full charge capacity is used as an index for detecting the degree of deterioration of the power storage device 20. The full charge capacity decreases with deterioration of the power storage device 20. For example, the deterioration degree of the power storage device 20 is detected based on the ratio of the current full charge capacity to the initial value of the full charge capacity.

The processor 11 estimates the full charge capacity of the power storage device 20 based on, for example, the Arrhenius method. The Arrhenius method is a method of estimating a full charge capacity of a power storage device (power storage cell) based on a disappearance amount of an electrolytic solution corresponding to a temperature. The processor 11 estimates the full charge capacity of the power storage device 20 (the power storage cell 21) based on the Arrhenius method using the detection value of the temperature sensor 22 of the power storage device 20.

The communication unit 12 is controlled by the processor 11. The communication unit 12 communicates with the respective devices (the power storage device 20, HMI device 40, the communication device 50, and the like) in electrified vehicle 100 by CAN (Controller Area Network) communication or the like. The communication unit 12 may be directly communicated with the mobile terminal 200 by CAN communication or the like, or may be indirectly communicated with the mobile terminal 200 by relaying the communication device 50.

The flash memory 13 is a nonvolatile memory. The flash memory 13 stores a program to be executed by the processor 11 and information (for example, a map, a mathematical expression, and various parameters) used in the program. The above-described programs and the above-described information may be stored in a ROM (Read Only Memory) (not shown) or the like that differs from the flash memory 13.

RAM14 is volatile memory. RAM14 stores the full charge capacity of the power storage device 20 estimated by the processor 11.

Here, for example, in order to suppress the auxiliary battery 30 from rising, the user may disconnect the electric connection between the auxiliary battery 30 and electrified vehicle 100 by removing the wire from the terminal 31 (32) of the auxiliary battery 30. In this situation, no electric power is supplied from the auxiliary battery 30 to ECU 10. At this time, the data stored in RAM14 is lost.

ECU 10 is unable to acquire (hold) the detected value of the temperature sensor 22 and the like while the electric power supplied from the auxiliary battery 30 to ECU 10 is interrupted. Therefore, even if the auxiliary battery 30 is electrically connected to electrified vehicle 100 later, ECU 10 cannot accurately estimate the full charge capacity of the power storage device 20 based on the Arrhenius method.

Therefore, in the present embodiment, the elapsed time T3 (see FIG. 2) from the point in time T1 (see FIG. 2) at which electrified vehicle 100 was last activated (ignition power was turned on) to the point in time T2 (see FIG. 2) at which electrified vehicle 100 was activated this time may be larger than a predetermined value. In this situation, the communication unit 12 transmits, to HMI device 40, a notification for prompting the power storage device 20 to diagnose the power storage device. The predetermined value is, for example, 5 days (120 hours). The predetermined value may be other than five days. Further, the point in point in time T1 is an exemplary "first point in time" of the present disclosure.

The elapsed time T3 being greater than the predetermined value means that electrified vehicle 100 has not been activated for a relatively long period of time since electrified vehicle 100 was previously activated. It is highly probable that the auxiliary battery 30 and electrified vehicle 100 were electrically disconnected from each other in order to suppress the auxiliary battery 30 from rising for a long period of time. Therefore, when it is highly likely that the auxiliary battery 30 is electrically disconnected from electrified vehicle 100, the user can be prompted to diagnose the power storage device 20.

Specifically, when the elapsed time T3 is larger than predetermined value, the communication unit 12 transmits, to HMI device 40, a notification that prompts electrified vehicle 100 to be stored in a facility capable of diagnosing the power storage device 20.

FIG. 3 is a diagram illustrating a display screen 41 of HMI device 40 (car navigation device) to which the notification is transmitted. On the display screen 41, a message 42 "Please go to the dealer and receive the diagnosis of the power storage device" is displayed. Note that a map indicating the position information of the nearest dealer and the position information of the dealer or the like that can immediately execute the diagnosis work may be displayed on the display screen 41. Note that the display of FIG. 3 is displayed at the timing (point in time T2) at which electrified vehicle 100 is activated this time. Note that a message prompting the user to receive a diagnosis may be displayed at a place other than the dealer (for example, a maintenance factory, a charge/discharge stand, or the like). FIG. 3 is merely an example, and the display content is not limited to this example.

In the dealer, for example, the full charge capacity of the power storage device 20 is estimated based on the charge/discharge electric power when SOC of the power storage device 20 is changed from 0% to 100%.

In the present embodiment, the flash memory 13 stores point in time T1. Specifically, the processor 11 stores the point in time T1 in the flash memory 13 when electrified vehicle 100 is started in the point in time T1. Further, the processor 11 acquires the information in the point in time T2 when electrified vehicle 100 is activated in the in the point in time T2, and calculates the elapsed time T3 based on the point in time T1 and the point in time T2. The point in time T2 is an exemplary "second time" of the present disclosure.

ECU Control Flowchart

Next, referring to FIG. 4, a control flow of electrified vehicle 100 (ECU 10 (processor 11)) will be described. Note that the control according to the present disclosure is not limited to the flow illustrated in FIG. 4. For example, the order of steps may be changed within a feasible range, or any of the steps may be omitted. Note that the flow of FIG. 4 may be started to be executed at a predetermined cycle (for example, a 10-minute cycle).

In S1, ECU 10 determines whether electrified vehicle 100 has been activated. If electrified vehicle 100 is activated (Yes in S1), the process proceeds to S2. If electrified vehicle 100 is not activated (No in S1), the process ends.

In S2, ECU 10 acquires the point in time T1 at which electrified vehicle 100 is activated in S1.

In S3, ECU 10 stores the point in time T1 acquired in S2 in the flash memory 13.

In S4, ECU 10 determines whether electrified vehicle 100 has been activated. If electrified vehicle 100 is activated (Yes in S4), the process proceeds to S5. If electrified vehicle 100 is not activated (No in S4), S4 process is repeated.

In S5, ECU 10 acquires the point in time T2 at which electrified vehicle 100 is activated in S4.

In S6, ECU 10 calculates the elapsed time T3 from the point in time T1 to the point in time T2.

In S7, ECU 10 determines whether or not the elapsed time T3 calculated in S6 is larger than five days (120 hours). If the elapsed time T3 is greater than five days (Yes in S7), it is determined that the auxiliary battery 30 is electrically disconnected from electrified vehicle 100, and the process proceeds to S8. If the elapsed time T3 is less than or equal to 5 days (No in S7), the process proceeds to S10.

In S8, ECU 10 transmits, through the communication unit 12, a notification prompting the dealer to diagnose the power storage device 20 to HMI device 40.

In S9, HMI device 40 displays the notification transmitted from ECU 10 in S8 on the display screen 41 (see FIG. 3).

In S10, ECU 10 determines whether or not the elapsed time T3 calculated in S6 is greater than three days (72 hours). If the elapsed time T3 is greater than 3 days (Yes in S10), the process proceeds to S11. When the elapsed time T3 is three days or less (No in S10), the process ends. The reference value in S10 may be other than 3 days.

In S11, ECU 10 transmits a notification prompting the user to self-diagnose the power storage device 20 to HMI device 40.

The self-diagnosis of the power storage device 20 is a method different from the estimation of the full charge capacity by the Arrhenius method. Specifically, the full charge capacity C of the power storage device 20 is estimated based on the difference (S1-S2) between SOC (e.g., S1 and S2) calculated twice at different timings and the charge/discharge electric power amount ΔAh between the timings at which the respective SOC are calculated. The full charge capacity C is calculated based on the following Expression (1).

$$C = Ah/|S1 - S2| \times 100 \qquad (1)$$

Figure 5:
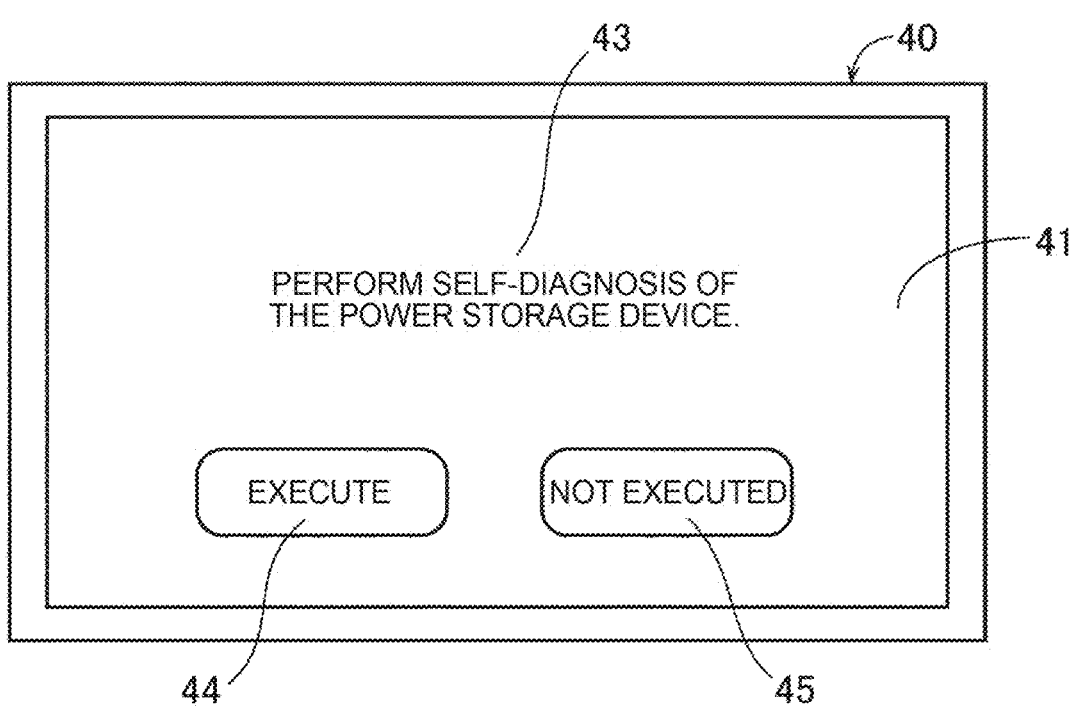
FIG. 5 is a second diagram illustrating a notification displayed on a HMI device of a electrified vehicle according to an embodiment.

In S12, HMI device 40 displays the notification transmitted from ECU 10 in S11 on the display screen 41 (see FIG. 5).

FIG. 5 is a diagram illustrating a display screen 41 of HMI device 40 (car navigation device) to which the notification of S11 is transmitted. On the display screen 41, a message 43 "Execute self-diagnosis of the power storage device" is displayed. Further, on the display screen 41, a button 44 described as "execute" and a button 45 described as "not execute" are displayed. When the button 44 is selected, the above-described self-diagnosis of the power storage device 20 is executed. When the button 45 is selected, the self-diagnosis of the power storage device 20 is not executed. Note that the example shown in FIG. 5 is merely an example, and the display content is not limited to this example.

As described above, in the present embodiment, the elapsed time T3 from the point in time T1 at which electrified vehicle 100 was previously activated to the point in time T2 at which electrified vehicle 100 was activated this time may be larger than five days. Here, ECU 10 (communication unit 12) transmits, to HMI device 40, a notification that prompts the power storage device 20 to diagnose. This makes it possible to prompt the user to diagnose the power storage device 20 when the elapsed time T3 is relatively large. Accordingly, when it is assumed that the full charge capacity of the power storage device 20 cannot be accurately estimated due to the disconnection of the electrical-connection between the auxiliary battery 30 and electrified vehicle 100, it is possible to prompt the user to diagnose the power storage device 20.

In the above embodiment, the notification prompting the diagnosis of the power storage device 20 is transmitted to HMI device 40, but the present disclosure is not limited thereto. The notification may be transmitted to the mobile terminal 200. In this case, the mobile terminal 200 is an example of an "information terminal" of the present disclosure.

In the above embodiment, the point in time T1 data is stored in the non-volatile flash memory 13, but the present disclosure is not limited to this. For example, ECU may transmit the information of the point in time T1 to the external server, and receive the information of the point in time T1 from the external server when calculating the elapsed time T3.

In the above-described embodiment, when the elapsed time T3 is larger than five days (predetermined value), a notification prompting the dealer to enter the dealer is transmitted to HMI device 40. For example, when the elapsed time T3 is larger than five days (a predetermined value), a notification prompting the self-diagnosis of the power storage device 20 may be transmitted to HMI device 40 or the like.

In the above embodiment, the full charge capacity of the power storage device 20 estimated by the processor 11 is stored in RAM14, but the present disclosure is not limited thereto. The full charge capacity of the power storage device 20 may be stored in a non-volatile memory such as the flash memory 13.

In the above-described embodiment, the self-diagnosis of the power storage device 20 is prompted when the elapsed time T3 is larger than three days. However, the present disclosure is not limited to this. The self-diagnosis of the power storage device 20 may not be prompted. In other words, S12 process may not be executed from S10 of FIG. 4.

In the above-described embodiment, HMI device 40 and the like display a message prompting the diagnosis of the power storage device 20, but the present disclosure is not limited thereto. The message may be notified to the user by voice, for example.

Note that the configurations (processes) of the above-described embodiments and the above-described modification examples may be combined with each other.

The embodiment disclosed herein shall be construed as exemplary and not restrictive in all respects. The scope of the present disclosure is shown by the claims rather than by the above description of the embodiments, and is intended to include all modifications within the meaning and scope equivalent to those of the claims.

What is claimed is:

1. A control device for controlling a vehicle in which a power storage device and an auxiliary battery are installed, and also from which auxiliary battery, electric power is supplied, the control device comprising:
   a processor that estimates a full charge capacity of the power storage device;
   first memory that stores the full charge capacity estimated by the processor; and
   a transmitter configured to communicate with an information terminal, wherein:
   the auxiliary battery is configured to be electrically disconnectable from the vehicle; and
   the transmitter transmits, to the information terminal, a notification prompting diagnosis of the power storage device, in response to an elapsed time from a first point in time at which the vehicle was started up a prior time to a second point in time at which the vehicle was started up this time being greater than a predetermined value.

2. The control device according to claim 1, further comprising second memory for storing the first point in time, the second memory being non-volatile.

3. The control device according to claim 1, wherein the notification recommends taking the vehicle to a facility configured to diagnose the power storage device.

4. The control device according to claim 1, wherein the first memory is volatile memory.

5. A vehicle, comprising:
   a power storage device;
   an auxiliary battery; and
   a control device comprising:
      a processor that estimates a full charge capacity of the power storage device;
      first memory that stores the full charge capacity estimated by the processor; and
      a transmitter configured to communicate with an information terminal, wherein:
   the auxiliary battery is configured to be electrically disconnectable from the vehicle; and
   the transmitter transmits, to the information terminal, a notification prompting diagnosis of the power storage device, in response to an elapsed time from a first point in time at which the vehicle was started up a prior time to a second point in time at which the vehicle was started up this time being greater than a predetermined value.

* * * * *